United States Patent
Sood et al.

(10) Patent No.: US 11,936,637 B2
(45) Date of Patent: *Mar. 19, 2024

(54) TECHNOLOGIES FOR PROVIDING SECURE UTILIZATION OF TENANT KEYS

(71) Applicant: Intel Corporation, Santa Clara, CA (US)

(72) Inventors: Kapil Sood, Portland, OR (US); Seosamh O'Riordain, Ennis (IE); Ned M. Smith, Beaverton, OR (US); Tarun Viswanathan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,934

(22) Filed: Oct. 19, 2022

(65) Prior Publication Data

US 2023/0171234 A1 Jun. 1, 2023

Related U.S. Application Data

(63) Continuation of application No. 16/876,626, filed on May 18, 2020, now Pat. No. 11,483,300, which is a (Continued)

(51) Int. Cl.
*H04L 9/40* (2022.01)
*G06F 9/4401* (2018.01)
(Continued)

(52) U.S. Cl.
CPC ............ *H04L 63/06* (2013.01); *G06F 9/4401* (2013.01); *G06F 9/45533* (2013.01);
(Continued)

(58) Field of Classification Search
CPC ............... G06F 9/4401; G06F 9/45533; G06F 9/45558; G06F 9/468; G06F 9/5077;
(Continued)

(56) References Cited

U.S. PATENT DOCUMENTS 8,565,422 B2 10/2013 Lee et al.
8,694,786 B2 4/2014 Augu et al.
(Continued)

OTHER PUBLICATIONS

United States Patent and Trademark Office, "Notice of Allowance," mailed in connection with U.S. Appl. No. 16/144,531, dated Mar. 12, 2020, 5 pages.
(Continued)

*Primary Examiner* — Amare F Tabor
(74) *Attorney, Agent, or Firm* — Hanley, Flight & Zimmerman, LLC

(57) ABSTRACT

Technologies for providing secure utilization of tenant keys include a compute device. The compute device includes circuitry configured to obtain a tenant key. The circuitry is also configured to receive encrypted data associated with a tenant. The encrypted data defines an encrypted image that is executable by the compute device to perform a workload on behalf of the tenant in a virtualized environment. Further, the circuitry is configured to utilize the tenant key to decrypt the encrypted data and execute the workload without exposing the tenant key to a memory that is accessible to another workload associated with another tenant.

23 Claims, 9 Drawing Sheets

Related U.S. Application Data continuation of application No. 16/144,531, filed on Sep. 27, 2018, now Pat. No. 10,708,247.

(51) Int. Cl.
| | |
|---|---|
| *G06F 9/455* | (2018.01) |
| *G06F 9/46* | (2006.01) |
| *G06F 9/50* | (2006.01) |
| *G06F 21/53* | (2013.01) |
| *G06F 21/57* | (2013.01) |
| *G06F 21/62* | (2013.01) |

(52) U.S. Cl.
CPC .......... *G06F 9/45558* (2013.01); *G06F 9/468* (2013.01); *G06F 9/5077* (2013.01); *G06F 21/53* (2013.01); *G06F 21/57* (2013.01); *G06F 21/6209* (2013.01); *H04L 63/0435* (2013.01); *H04L 63/062* (2013.01); *H04L 63/083* (2013.01); *G06F 2009/45587* (2013.01); *G06F 2009/45595* (2013.01)

(58) Field of Classification Search
CPC ...... G06F 21/53; G06F 21/57; G06F 21/6209; G06F 2009/45587; G06F 2009/45595; H04L 63/0435; H04L 63/06; H04L 63/062; H04L 63/083
USPC .......................................................... 713/168
See application file for complete search history.

(56) References Cited

U.S. PATENT DOCUMENTS

| | | | | |
|---|---|---|---|---|
| 9,292,673 | B2* | 3/2016 | Rutkowski | .......... H04L 63/0428 |
| 9,367,360 | B2 | 6/2016 | Jubran et al. | |
| 9,459,925 | B2 | 10/2016 | Lawson et al. | |
| 9,594,638 | B2 | 3/2017 | Potlapally et al. | |
| 9,602,283 | B1* | 3/2017 | Chandra | ............. G06F 16/1748 |
| 9,680,805 | B1* | 6/2017 | Rodgers | .............. H04L 63/0281 |
| 9,779,269 | B1* | 10/2017 | Perlman | .............. G06F 16/2291 |
| 9,965,645 | B2 | 5/2018 | Sinor | |
| 9,992,186 | B1 | 6/2018 | Drozd et al. | |
| 10,007,767 | B1 | 6/2018 | Ahmed et al. | |
| 10,013,364 | B1* | 7/2018 | O'Brien | ............. G06F 21/6218 |
| 10,177,908 | B2 | 1/2019 | Hamel et al. | |
| 10,296,757 | B2 | 5/2019 | Gupta | |
| 10,326,744 | B1* | 6/2019 | Nossik | ................ H04L 63/0435 |
| 10,439,803 | B2 | 10/2019 | Lange | |
| 10,454,915 | B2 | 10/2019 | Mohamad Abdul et al. | |
| 10,509,768 | B2 | 12/2019 | Balachandran et al. | |
| 10,547,442 | B2* | 1/2020 | O'Toole | ................. H04L 9/0863 |
| 10,693,640 | B2* | 6/2020 | Gray | ..................... H04L 9/0894 |
| 10,708,247 | B2 | 7/2020 | Sood et al. | |
| 10,963,587 | B1 | 3/2021 | Namjoshi et al. | |
| 11,483,300 | B2 | 10/2022 | Sood et al. | |
| 2008/0229117 | A1 | 9/2008 | Shin et al. | |
| 2014/0129847 | A1 | 5/2014 | Lee et al. | |
| 2014/0351586 | A1 | 11/2014 | Hook et al. | |
| 2015/0186671 | A1 | 7/2015 | O'Hare et al. | |
| 2018/0332108 | A1 | 11/2018 | Simek et al. | |
| 2019/0095350 | A1 | 3/2019 | Durham et al. | |
| 2019/0102568 | A1* | 4/2019 | Hausauer | .............. H04L 9/3242 |
| 2019/0102577 | A1 | 4/2019 | Gueron et al. | |

OTHER PUBLICATIONS

United States Patent and Trademark Office, "Final Office Action," mailed in connection with U.S. Appl. No. 16/144,531, dated Jan. 17, 2020, 9 pages.

United States Patent and Trademark Office, "Non-final Office Action," mailed in connection with U.S. Appl. No. 16/144,531, dated Sep. 20, 2019, 12 pages.

United States Patent and Trademark Office, "Notice of Allowance and Fee(s) Due," mailed in connection with U.S. Appl. No. 16/876,626, dated Jun. 8, 2022, 7 pages.

United States Patent and Trademark Office, "Final Rejection," mailed in connection with U.S. Appl. No. 16/876,626, dated Mar. 17, 2022, 6 pages.

United States Patent and Trademark Office, "Non-Final Rejection," mailed in connection with U.S. Appl. No. 16/876,626, dated Oct. 27, 2021, 10 pages.

* cited by examiner

TECHNOLOGIES FOR PROVIDING SECURE UTILIZATION OF TENANT KEYS

CROSS-REFERENCE TO RELATED APPLICATIONS

This patent arises from a continuation of U.S. patent application Ser. No. 16/876,626, filed on May 18, 2020, which is a continuation of U.S. patent application Ser. No. 16/144,531, filed on Sep. 27, 2018. Priority to U.S. patent application Ser. No. 16/876,626 and U.S. patent application Ser. No. 16/144,531 is claimed. U.S. patent application Ser. No. 16/876,626 and U.S. patent application Ser. No. 16/144,531 are hereby incorporated herein by reference in their respective entireties.

BACKGROUND

In typical cloud service provider environments, virtual network function providers and cloud customers that use standard cloud operating system (OS) installation offerings can use disk encryption in their operating system images. However, OS disk encryption capabilities that are provisioned and used on general purpose servers today still use methods that result in the bulk encryption master key being first derived and then extracted in the clear to random access memory to be used directly in software or hardware assisted cipher application programming interfaces (APIs). In multi-cloud environments (i.e., multiple cloud computing and storage services in a single heterogeneous architecture), customers and content service providers (collectively referred to as tenants) do not want to share or see any sensitive data, including encryption keys, of another tenant. Moreover, side-channel attacks may be executed on certain processor architectures to view otherwise inaccessible data in random access memory. Furthermore, existing solutions may be at risk to another attack vector whereby a rogue system administrator with elevated privileges may acquire keying material for storage media. Additionally, European Telecommunications Standards Institute (ETSI) network function virtualization (NFV) architecture specifications require virtual network functions images to be delivered by vendors and stored in repositories that are accessible to multiple entities, thereby raising the possibility that the images could be stolen, reverse engineered, manipulated to introduce malware code injection, and/or deployed on unauthorized systems.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
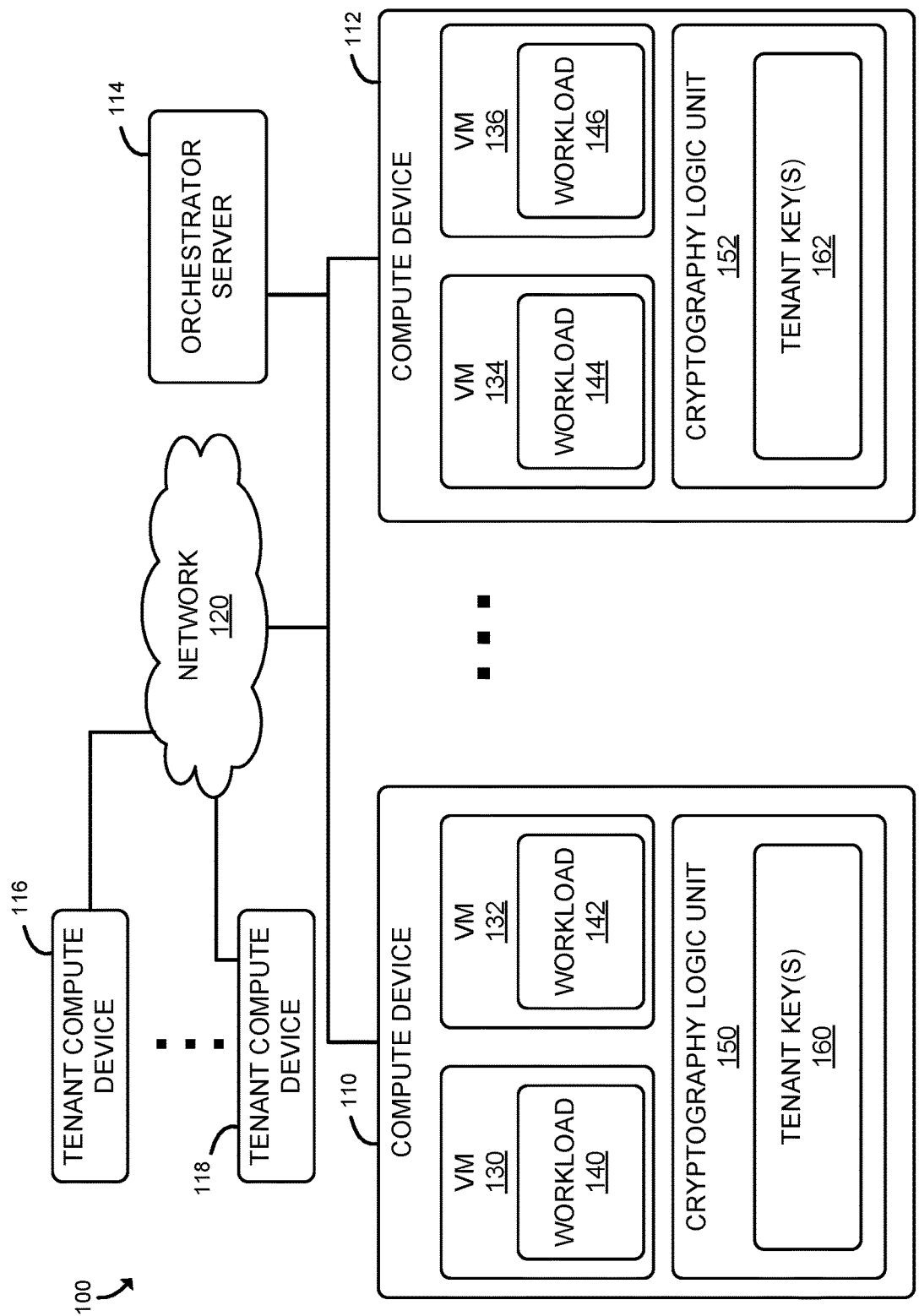
FIG. 1 is a simplified diagram of at least one embodiment of a system for providing secure utilization of tenant keys.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing secure utilization of tenant keys includes a set of compute devices 110, 112 in communication with an orchestrator server 114 (e.g., a compute device to assign workloads to the compute devices 110, 112 for execution) and a set of tenant compute devices 116, 118 (e.g., compute devices of customers for whom workloads are executed by the compute devices 110, 112). In the illustrative embodiment, the compute devices 110, 112, the orchestrator server 114, and the tenant compute devices 116, 118 are in communication through a network 120. In some embodiments, all or a portion of the system 100 may be located at the "edge" of a cloud meaning the computing infrastructure exists close to the sources or consumers of data and away from a core of a cloud (e.g., a centralized data center). In other words, the edge is located in an area between endpoint devices (e.g., mobile computing devices, Internet of Things (IoT) devices, smart devices, etc.) and traditional network access points and serves as an ingress point into service provider core networks, including carrier networks (e.g., Global System for Mobile Communications (GSM) networks, Long-Term Evolution (LTE) networks, 5G networks, etc.), while also providing storage and/or compute capabilities. As some computations/processing can be performed at the edge, efficiencies such as reduced latency, bandwidth, etc., can be realized (i.e., relative to such computations/processing being performed at a remote cloud, data center, etc.). Depending on the intended purpose/capabilities of the edge, the edge may include one or more edge computing devices, which may include one or more gateways, servers, multi-access edge computing (MEC) appliances, etc. It should be appreciated that, in some embodiments, the edge may form a portion of or otherwise provide an ingress point into a fog network, which may be embodied as a system-level horizontal architecture that distributes resources and services of computing, storage, control and networking anywhere between a central data center and an endpoint device (e.g., the tenant compute devices 116, 118).

The compute devices 110, 112, in the illustrative embodiment, execute workloads (e.g., set of operations, functions, applications, etc.) on behalf of the tenant compute devices 116, 118. Further, in the illustrative embodiment, the compute devices 110, 112 execute the workloads 140, 142, 144, 146 in corresponding virtualized environments such as virtual machines (e.g., virtual machines 130, 132, 134, 136) or containers (e.g., a lightweight, standalone, executable package of software that includes everything needed to run an application, including code, runtime, system tools, system libraries and settings). In doing so, the compute devices 110, 112 receive tenant keys 160, 162 (e.g., each embodied as a piece of information that determines the functional output of a cryptographic algorithm) through a secure communication protocol and stores the tenant keys 160, 162 in corresponding cryptography logic units 150, 152, each of which may be embodied as any device or circuitry (e.g., a co-processor, a controller, an application specific integrated circuit (ASIC), etc.) configured to perform cryptographic operations (e.g., encryption, decryption, authentication, etc.) on encrypted tenant data (e.g., encrypted firmware images, encrypted VM, container, and/or virtual network function images, configuration settings, etc.) using a cryptographic key (e.g., a corresponding tenant key 160) without writing the tenant key to a memory (e.g., dynamic random access memory (DRAM)) that is accessible to other tenants or to an operator of the system 100. As such, compared to typical systems, the system 100 provides encryption, decryption, and authentication services on behalf of a tenant, using the tenant's key, without exposing the tenant's key to potential theft by another party (e.g., another tenant, an owner of the system, etc.).

Figure 2:
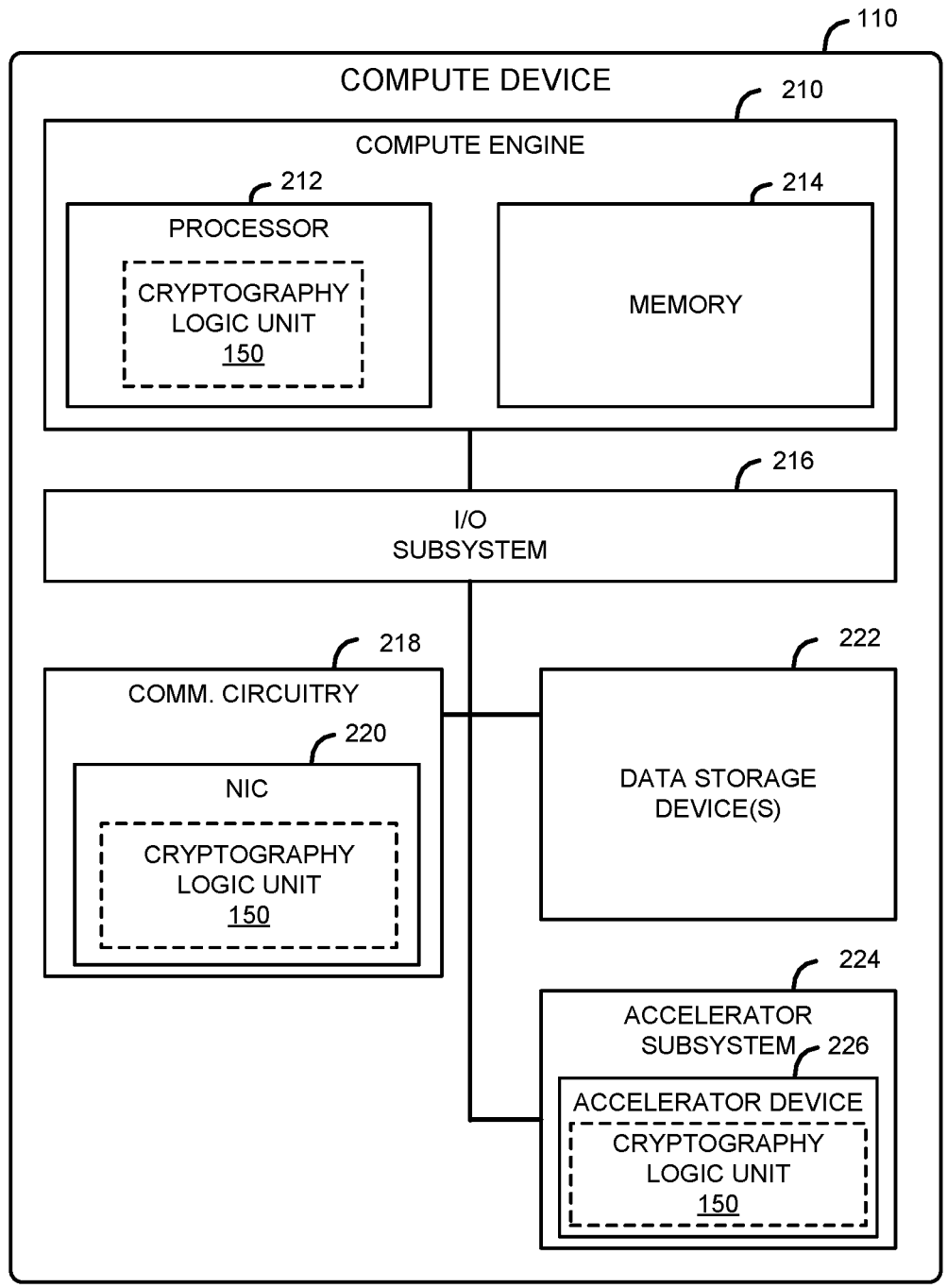
FIG. 2 is a simplified block diagram of at least one embodiment of a compute device included in the system of FIG. 1.

Referring now to FIG. 2, the illustrative compute device 110 includes a compute engine (also referred to herein as "compute engine circuitry") 210, an input/output (I/O) subsystem 216, communication circuitry 218, and one or more data storage devices 222. In the illustrative embodiment, the compute device 110 also includes an accelerator subsystem 224. Of course, in other embodiments, the compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein. In some embodiments, the processor 212 includes the cryptography logic unit 150, described above with reference to FIG. 1. In some embodiments, the cryptography logic unit 150 may be based on Intel Key Protection Technology (KPT), Intel Quick Assist Technology (QAT), Intel Software Guard Extensions (SGX), and/or Intel TDX technology.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte or bit addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, libraries, and drivers.

The compute engine 210 is communicatively coupled to other components of the compute device 110 via the I/O subsystem 216, which may be embodied as circuitry and/or components to facilitate input/output operations with the compute engine 210 (e.g., with the processor 212 and/or the main memory 214) and other components of the compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 110, into the compute engine 210.

The communication circuitry 218 may be embodied as any type of circuit, component, device, or collection thereof capable of facilitating communications between communications over the network 120 between the compute device 110 and another compute device (e.g., the orchestrator server 114, the tenant compute devices 116, 118, etc.). For example, the communication circuitry may be embodied as, or otherwise include, a network interface card or controller (NIC), a host fabric interface (HFI), a modem, a transmitter, a receiver, a transceiver, a transponder, a repeater, a cellular communication circuit, an optical network communication circuit, a microwave communication circuit, a wireless communication circuit, a wired communication circuit, and/or other communication circuit, device, component, or system. The communication circuitry 218 may be configured to communicate via wired and/or wireless network(s) and may use corresponding wireless and/or wired communication protocols. For example, the communication circuitry may be embodied as hardware located on an expansion card connected to a data bus (e.g., the I/O subsystem 216) or may be integrated into a motherboard or other component of the compute device 110. The communication circuitry may support interrupt and direct memory access (DMA) interfaces to the host processor (e.g., the processor 212), multiple receive and transmit queues, partitioning or virtualization into multiple logical interfaces, and/or offloading of functions (e.g., transport control protocol (TCP) processing) from the processor 212. The communication circuitry, in the illustrative embodiment, includes circuitry (e.g., a PHY chip) to implement the physical layer of the Open Systems Interconnection model (e.g., used in Ethernet, Wi-Fi®, Bluetooth®, WiMax, etc.), in which a bitstream is grouped into code words or symbols and converted to a physical signal that is transmitted over a transmission medium, and the data link later, in which data is transferred in frames between adjacent network nodes and errors occurring in the physical layer are detected and corrected. As such, the illustrative communication circuitry 218 provides a base for a full network protocol stack (e.g., the remaining layers of the Open Systems Interconnection model), allowing communication between the compute device 110 and other devices through a network.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the compute device 110 to connect with another compute device (e.g., the orchestrator server 114, the tenant compute devices 116, 118, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 110 at the board level, socket level, chip level, and/or other levels. In some embodiments, the NIC 220 may include the cryptography logic unit 150 described above.

Each data storage device 222 may be embodied as any type of device configured for short-term or long-term storage of data such as, for example, memory devices and circuits, memory cards, hard disk drives, solid-state drives, or other data storage device. The data storage device 222 may include a system partition that stores data and firmware code for the data storage device 222. The data storage device 222 may also include one or more operating system partitions that store data files and executables for operating systems (e.g., in an encrypted form).

The accelerator subsystem 224, in the illustrative embodiment, includes an accelerator device 226, which may be embodied as any device or circuitry (e.g., an ASIC, a field programmable gate array (FPGA), reconfigurable circuitry, etc.) capable of executing one or more operations faster than the processor 212 is capable of executing those operations. The accelerator device 226, in some embodiments, may include the cryptography logic unit 150 described above. While a single accelerator device 226 is shown in the accelerator subsystem 224, it should be understood that in other embodiments, the accelerator subsystem 224 may include a different number of accelerator devices. Further, while shown as a single unit, it should be understood that the components of the compute device 110 may be disaggregated (e.g., located in different portions of a rack, distributed across a data center, etc.).

The compute device 112, the orchestrator server 114, and the tenant compute devices 116, 118 may have components similar to those described in FIG. 2 with reference to the compute device 110. The description of those components of the compute device 110 is equally applicable to the description of components of the compute device 112, the orchestrator server 114, and the tenant compute devices 116, 118, with the exception that the tenant compute devices 116, 118 in some embodiments, do not include the cryptographic logic unit 150. Further, it should be appreciated that any of the compute devices 110, 112, the orchestrator server 114, and the tenant compute devices 116, 118 may include other components, sub-components, and devices commonly found in a computing device, which are not discussed above in reference to the compute device 110 and not discussed herein for clarity of the description.

As described above, the compute devices 110, 112, the orchestrator server 114, and the tenant compute devices 116, 118 are illustratively in communication via the network 120, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

Figure 3:
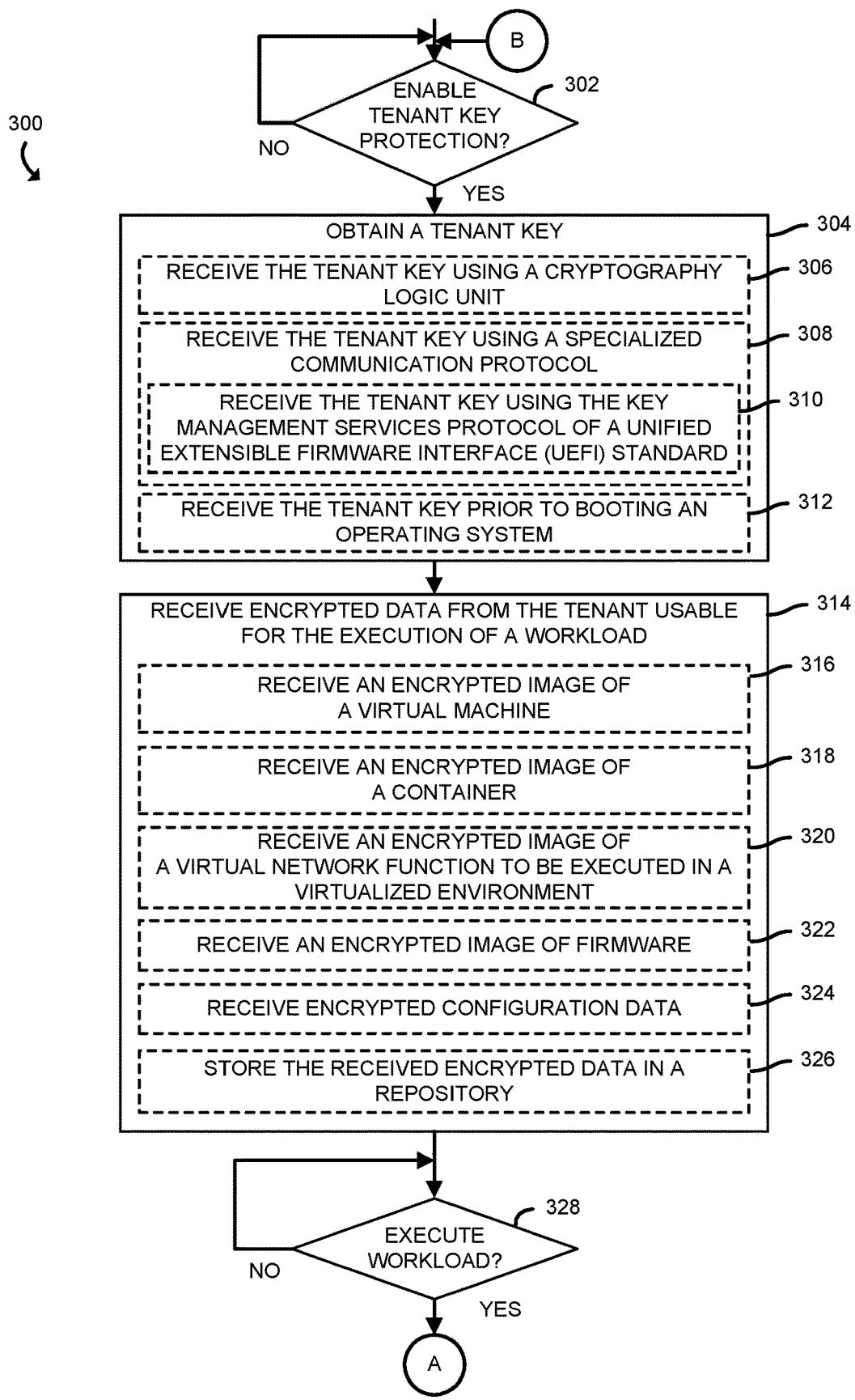
FIGS. 3-4 are a simplified block diagram of at least one embodiment of a method for providing secure utilization of tenant keys that may be performed by a compute device of the system of FIG. 1.

Referring now to FIG. 3, a compute device (e.g., the compute device 110) of the system 100 may perform a method 300 for providing secure utilization of tenant keys. The method 300 begins with block 302 in which the compute device 110 determines whether to enable tenant key protection. In doing so, the compute device 110 may determine to enable tenant key protection in response to detecting that the compute device 110 is equipped with the cryptography logic unit 150, in response to a request from another compute device (e.g., the orchestrator server 114) to enable tenant key protection, and/or based on other factors. Regardless, in response to a determination to enable tenant key protection, the method 300 advances to block 304 in which the compute device 110 obtains a tenant key (e.g., a tenant key 160). In doing so, the compute device 110 may receive the tenant key using the cryptography logic unit 150, as indicated in block 306. Further, and as indicated in block 308, the compute device 110 may receive the tenant key using a specialized communication protocol, such as the key management services protocol of the unified extensible firmware interface (UEFI) version 2.3.1, as indicated in block 310. As indicated in block 312, the compute device 110, in the illustrative embodiment, receives the tenant key prior to booting an operating system of the compute device 110. In the illustrative embodiment, the compute device 110 stores the tenant key 160 in the cryptography logic unit 150, rather than in the memory 214. The tenant key 160 may be exported to the compute device 110 from a key server associated with the corresponding tenant.

Subsequently, in block 314, the compute device receives encrypted data (e.g., data encrypted using the tenant key 160) from the tenant. The encrypted data, as described in more detail herein, is usable for the execution of a workload (e.g., the workload 140) by the compute device 110 on behalf of the tenant. In receiving the encrypted data, the compute device 110 may receive an encrypted image (e.g., data defining a copy) of a virtual machine (e.g., the virtual machine 130), as indicated in block 316. Alternatively, the compute device 110 may receive an encrypted image of a container, as indicated in block 318. The compute device 110, in receiving the encrypted data, may also receive an encrypted image of a virtual network function (e.g., data defining a set of operations to be performed in a virtualized environment such as a virtual machine or container), as indicated in block 320. The compute device 110 may also receive an encrypted image of firmware (e.g., to define functions executable by one or more hardware components of the compute device 110), as indicated in block 322. Further, the compute device 110 may receive encrypted configuration data (e.g., quality of service settings, such as a target latency threshold to be satisfied by the compute device 110, parameters to be passed to the virtual network function, etc.), as indicated in block 324. Additionally, the compute device 110 may store the received encrypted data in a repository (e.g., a data storage device) as indicated in block 326. In some embodiments, one or more of the operations of block 314 may be performed at least in part by the orchestrator server 114 (e.g., the orchestrator server 114 may initially receive the encrypted data and store it in a repository before providing it to the compute device 110). Regardless, in block 328, the compute device 110 determines whether to execute a workload (e.g., the workload associated with the received encrypted data from block 314). If not, the method 300 may continually loop back to block 328 to again determine whether the compute device 110 is to execute a workload or may loop back to block 304 to receive a tenant key and encrypted data for another tenant. However, in response to a determination to execute a workload (e.g., in response to a determination that the encrypted data has been received, in response to a request from the orchestrator server 114 to execute the workload associated with the received encrypted data, etc.), the method 300 advances to block 330 of FIG. 4, in which the compute device 110 may retrieve the encrypted data of the tenant.

Figure 4:
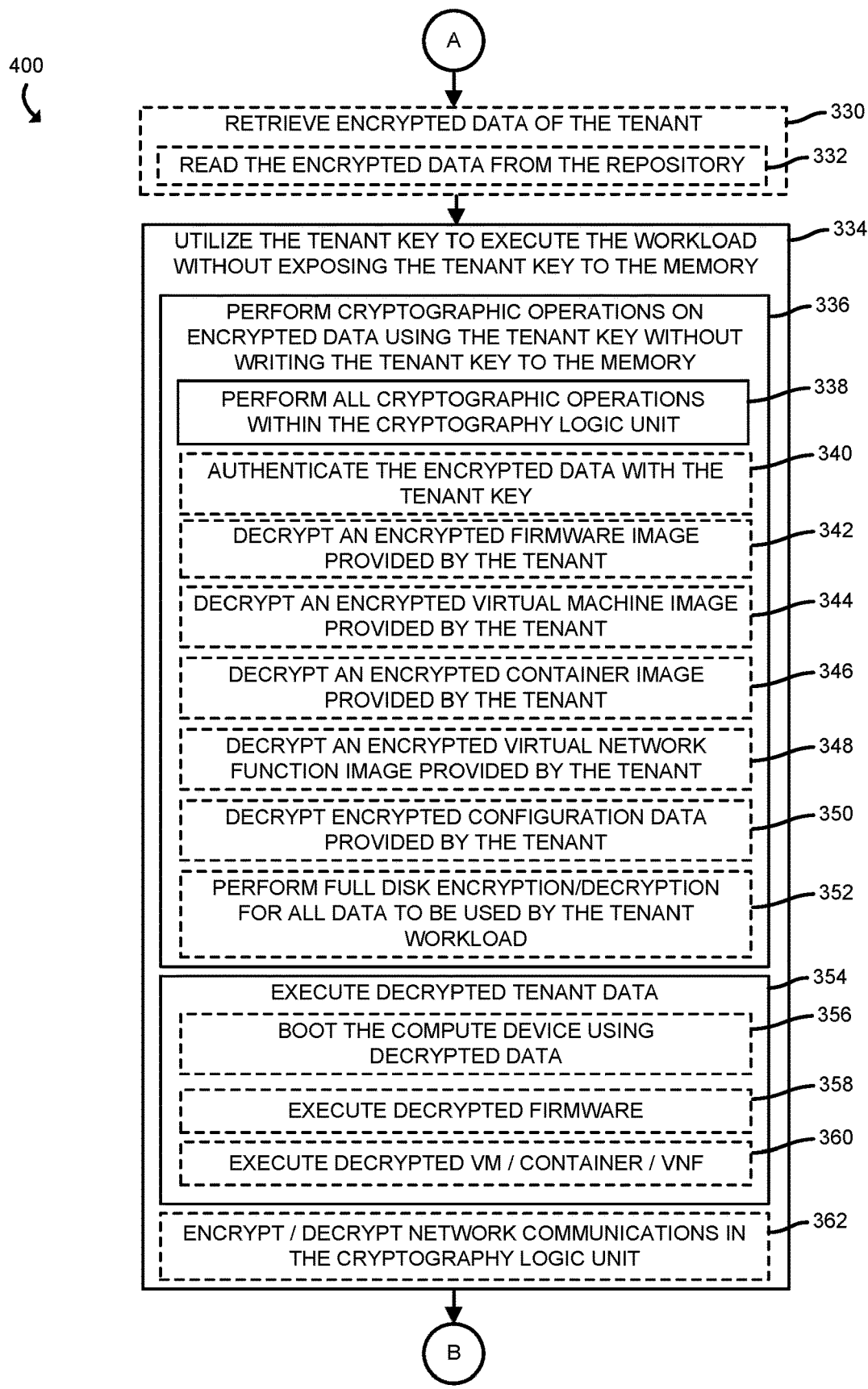

Referring now to FIG. 4, in retrieving the encrypted data of the tenant, the compute device 110 may read the encrypted data from the repository (e.g., the repository into which the encrypted data may have been stored in block 326), as indicated in block 332. In other embodiments, the compute device 110 does not perform the operations of blocks 330, 332 (e.g., the encrypted data is not stored and retrieved from a repository). Regardless, in block 334, the compute device 110, in the illustrative embodiment, utilizes the tenant key 160 to execute the workload 140 without exposing the tenant key to the memory 214. In doing so, the compute device 110, in the illustrative embodiment, performs cryptographic operations on the encrypted data using the tenant key 160 without writing the tenant key 160 to the memory 214, as indicated in block 336. To do so, in the illustrative embodiment, the compute device 110 performs all cryptographic operations within the cryptography logic unit (e.g., rather than performing the operations with the processor 212 and without reading the tenant key 160 out of the cryptography logic unit 150), as indicated in block 338.

In performing the cryptographic operations, the compute device 110 may authenticate the encrypted data with the tenant key 160 (e.g., by performing a hashing function on the encrypted data using the tenant key 160 and determining whether the resulting hash matches a hash provided by the tenant in a predefined section of the encrypted data), as indicated in block 340. The compute device 110, in performing the cryptographic operations, may decrypt an encrypted firmware image provided by the tenant (e.g., from block 322 of FIG. 3), as indicated in block 342. The compute device 110 may also decrypt an encrypted virtual machine image (e.g., from block 316 of FIG. 3), as indicated in block 344. Alternatively, the compute device 110 may decrypt an encrypted container image (e.g., from block 318), as indicated in block 346. As indicated in block 348, the compute device 110 also decrypts an encrypted virtual network function image provided by the tenant (e.g., the encrypted virtual network function image from block 320 of FIG. 3). In block 350, the compute device 110 may decrypt encrypted configuration data provided by the tenant (e.g., the encrypted configuration data from block 324 of FIG. 3). As indicated in block 352, the compute device 110 may perform full disk encryption and decryption for all data to be used by the tenant's workload 140.

In block 354, in the illustrative embodiment, the compute device 110 executes the decrypted tenant data. In doing so, the compute device 110 may perform a boot process (e.g., to load an operating system, drivers, etc.). In block 358, the compute device 110 may execute the decrypted firmware (e.g., from block 342) and/or may execute a decrypted virtual machine (e.g., the virtual machine 130), a container (e.g., from block 346), and/or virtual network function (e.g., from block 348), as indicated in block 360. Additionally, as indicated in block 362, the compute device 110 may encrypt and decrypt network communications associated with the workload 140 using the cryptography logic unit 150. Subsequently, the method 300 may loop back to block 302 in which the compute device 110 determines whether to continue to enable tenant key protection. While described as being performed in a particular sequence, it should be understood that the blocks of the method 300 may be performed in a different sequence and/or concurrently, and that while described in relation to a single tenant, it should be understood that the compute device 110 may concurrently perform the method 300 for tenant keys and workloads associated with other tenants.

Figure 5:
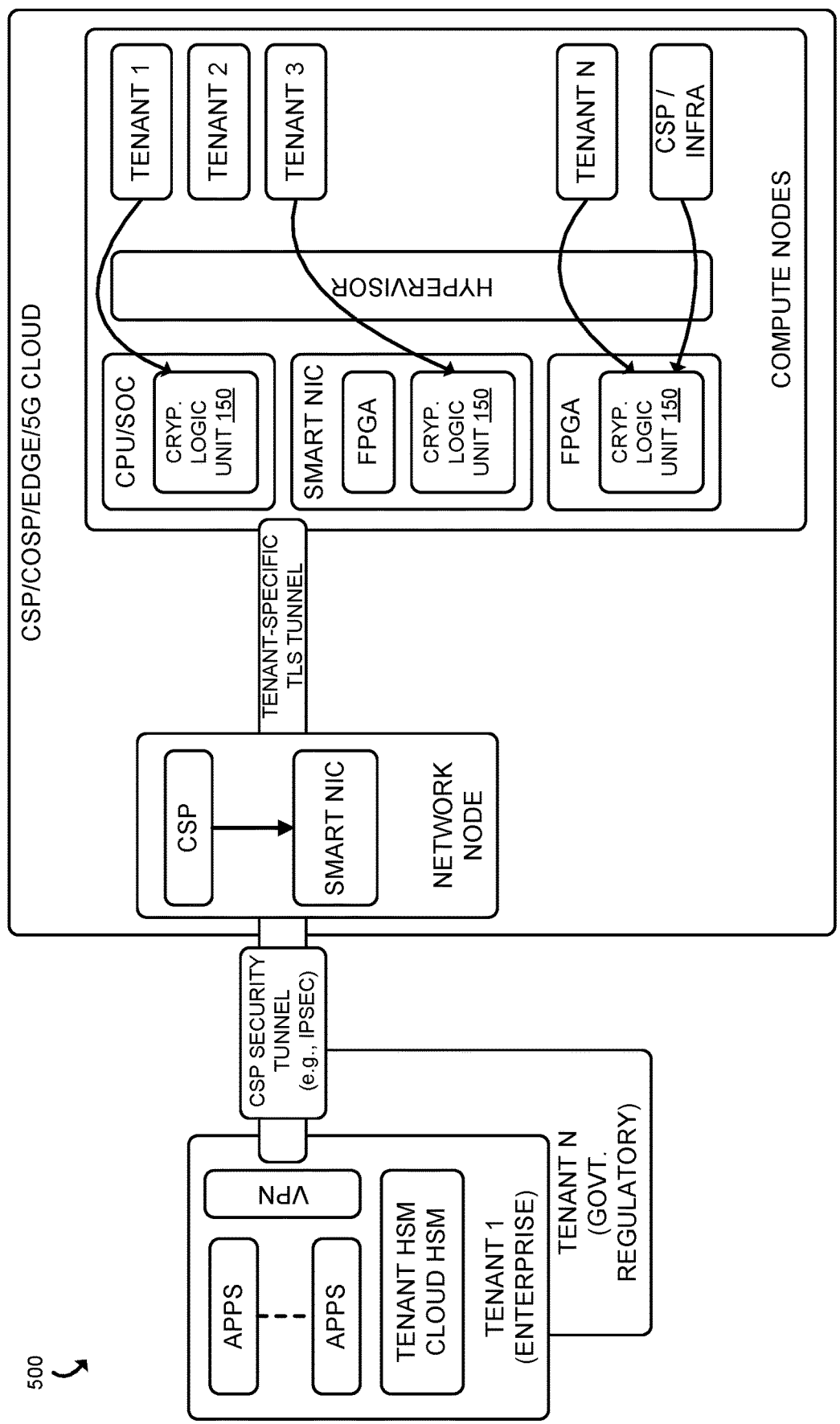
FIG. 5 is a simplified block diagram of multiple tenants securely delivering their keys to at least one embodiment of the system of FIG. 1.

Referring now to FIG. 5, in a multi-Cloud deployment of the system 100, multiple enterprises (tenants) securely deliver their own key into the infrastructure 500. As shown, the cryptography logic unit 150 is present in a central processing unit (CPU)/system on a chip (SOC), a NIC that is also equipped with an FPGA (a "Smart NIC"), and in an accelerator device, namely an FPGA. The tenants' virtual machines on the infrastructure 500 are responsible for delivering the corresponding encrypted tenant key into the cryptography logic unit 150 using per-part unique Rivest-Shamir-Adleman (RSA) keys. Once the tenant keys are securely delivered into the cryptography logic units 150, the compute nodes (e.g., the compute devices 110, 112) (a) decrypt the tenants' encrypted virtual machines, containers, and/or functions, (b) decrypt the tenants' configuration and other image meta-data, and (c) perform full disk encryption for all data (e.g., files) mounted on or used by the tenant virtual machine, or for any other tenant use.

Figure 6:
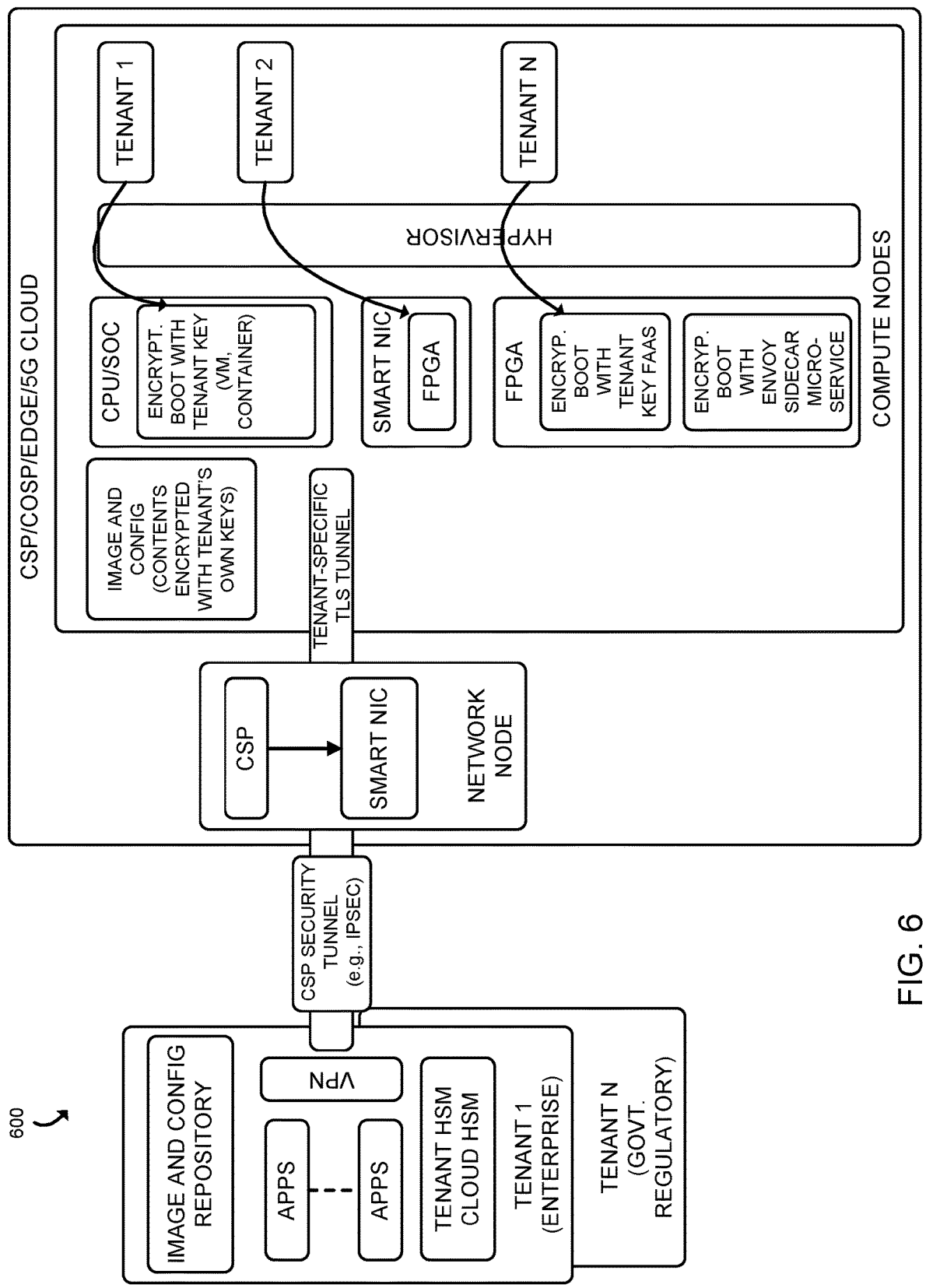
FIG. 6 is a simplified block diagram of a flow for instantiation of workloads based on encrypted images provided by multiple tenants that may be performed by at least one embodiment of the system of FIG. 1.

Referring now to FIG. 6, in the infrastructure 600, which is similar to the infrastructure 500, once provisioning is complete, the tenant delivers their encrypted virtual machines, containers, and/or functions into the operator's orchestration system. The operator may deploy these encrypted workloads using OpenStack Nova, Kubernetes Containers, Dockets, or any other function-as-a-service (Faas) service. Once the tenant's encrypted workload (or configuration) is on the platform, the image is decrypted by the cryptography logic unit 150 using the tenant key that was delivered into the cryptography logic unit 150 earlier (e.g., as described with reference to FIG. 5). Additionally or alternatively, the tenant-provisioned key can be used for full disk encryption of tenant VMs, installing and loading encrypted configurations or meta-data of the image, and/or network security processing.

Figure 7:
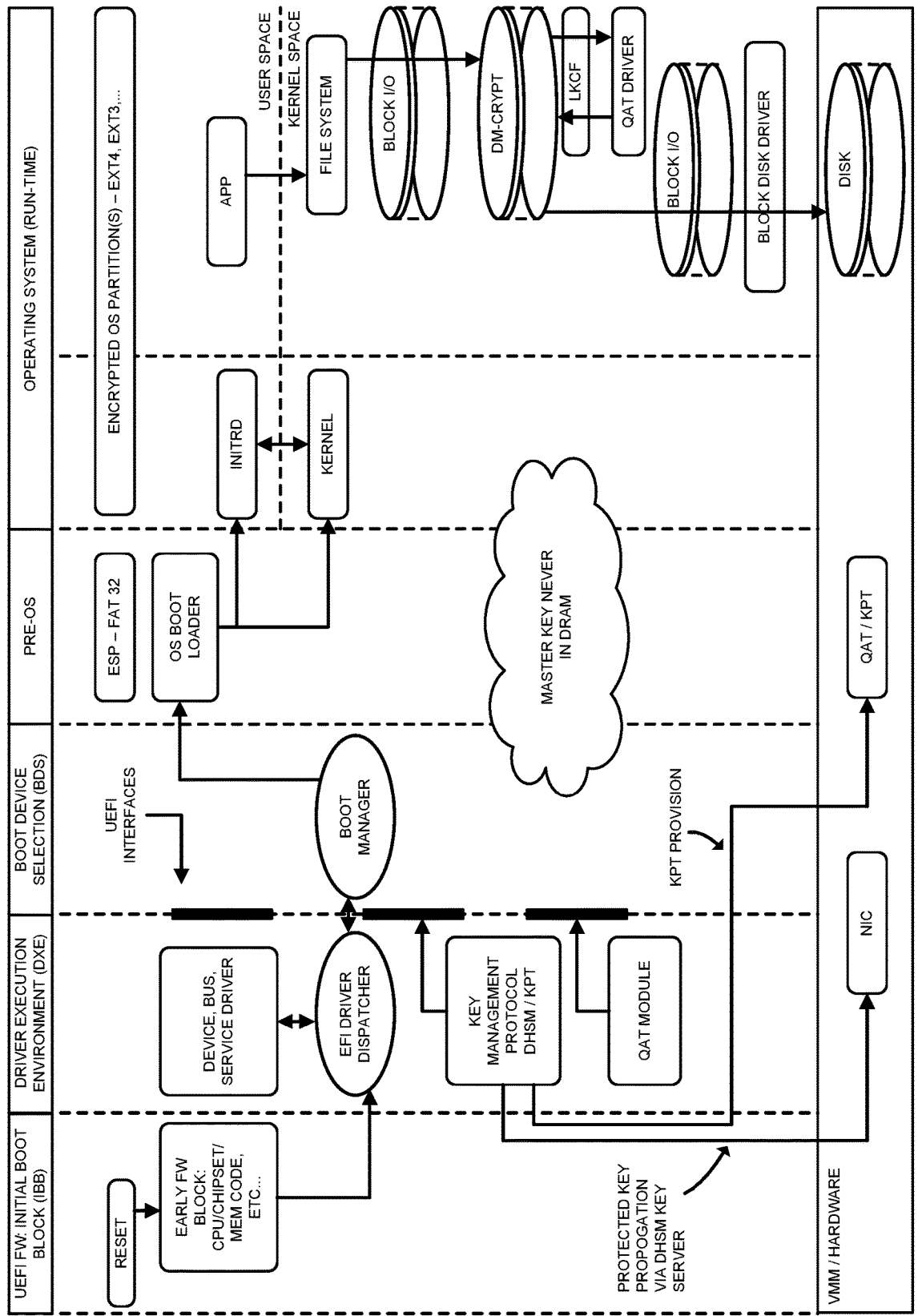
FIG. 7 is a simplified boot flow using full disk encryption that may be performed by at least one embodiment of the system of FIG. 1.

Referring now to FIG. 7, a boot flow in which full disk encryption is performed is shown. Importantly, at no point in the process is the tenant's key (the master key) exposed to the memory 214 (e.g., DRAM). As shown, a UEFI driver component initializes the QAT and KPT blocks, which collectively form the cryptographic logic unit 150 described above. Additionally, a UEFI protocol interfaces to QAT/KPT crypto (cipher/hash) and key protection features. Further, a UEFI dHSM (dynamic hardware security module) KPT component communicates with a dHSM KPT key server on a connecting network. Additionally, a UEFI protocol implementation is present for key management services. Furthermore, a bootloader storage media disk encryption component module and library for accessing QAT/KPTs capabilities prior to loading the operating system is present, thus enabling QAT/KPT usage for full disk encryption (FDE). Additionally, a Linux kernel component module to interface the current disk encryption subsystem to the QAT/KPT and UEFI dHSM component is present. Further, UEFI and Linux OS provisioning utilities are present. As the tenant's key is propagated into the KPT/QAT hardware (e.g., the cryptography logic unit 150), the dm-crypt module subsequently uses KPT/QAT (via the QAT driver component) for the required encryption/decryption, without being exposed to the key, prior to accessing the block I/O device. It should be noted that all of the components shown in FIG. 7 are also capable of being used within a bare-metal server environment as well as within a virtual machine manager (VMM)/VM environment, where QAT/KPT is provided as a virtual function, via technologies such as single-root input/output virtualization (SRIOV) or scalable input/output virtualization (SIOV), to the VM at launch time.

Figure 8:
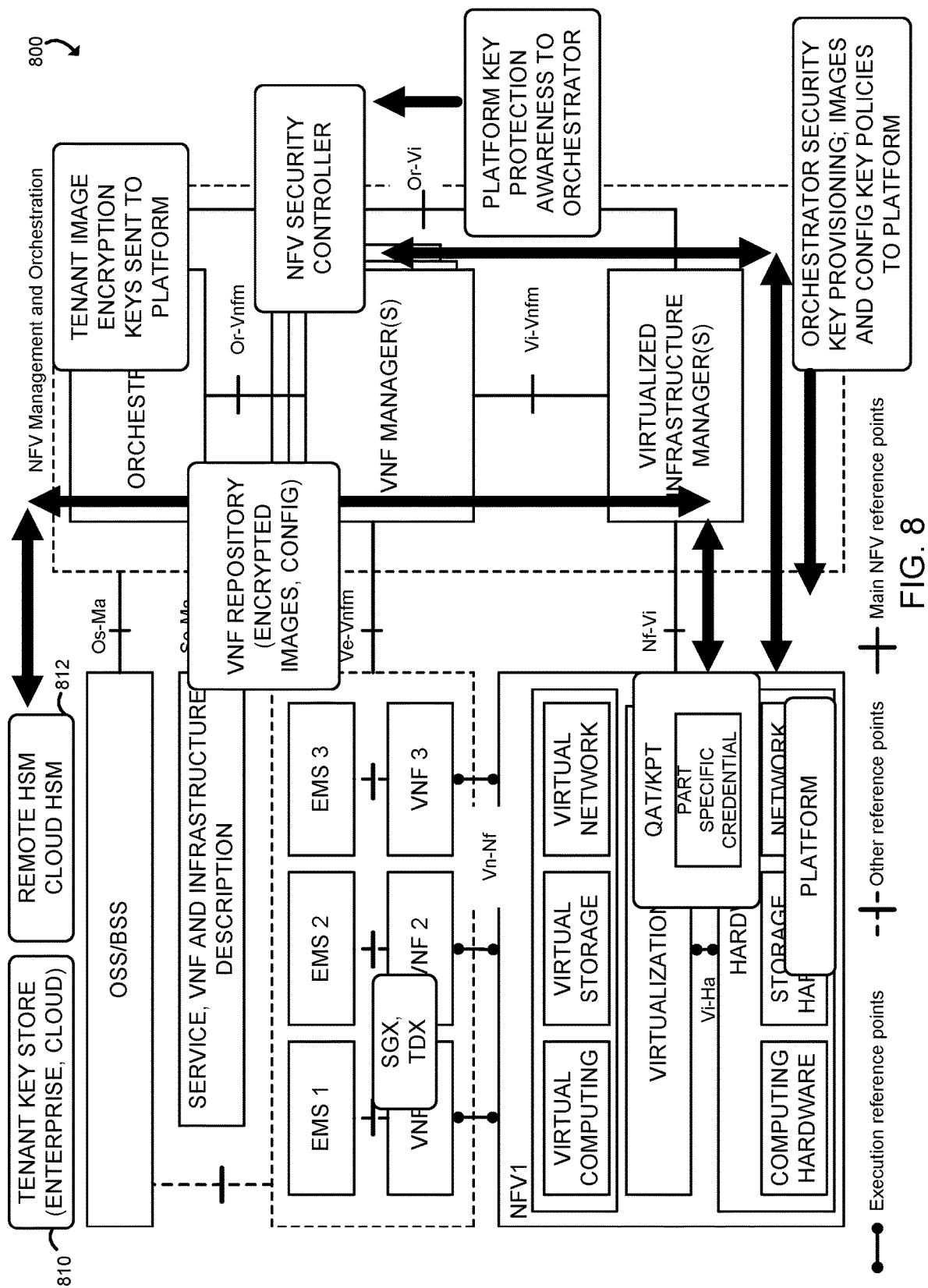
FIG. 8 is a simplified block diagram of at least one embodiment of the system of FIG. 1 in the context of a European Telecommunications Standards Institute (ETSI) network function virtualization (NFV)/mobile edge computing (MEC) architecture.

Referring now to FIG. 8, an embodiment of the system 800, similar to the system 100, is shown in the context of the ETSI NFV standards architecture. The provisioning phase is shown in boxes 810, 812, where the tenant securely delivers their key into the infrastructure, via the management and orchestration subsystem (MANO). The tenants deliver their encrypted VMs into the VNF repository. Once the security posture is attested and assurance has been obtained that the tenant key is provisioned on the designated platform, then the orchestrator delivers the appropriate encrypted VM into the compute infrastructure. At the compute infrastructure, QAT and KPT (collectively, the functions of the cryptography logic unit 150) decrypt the image, configuration files, and any encrypted disks. The infrastructure owner is never able to view the tenant's key.

Figure 9:
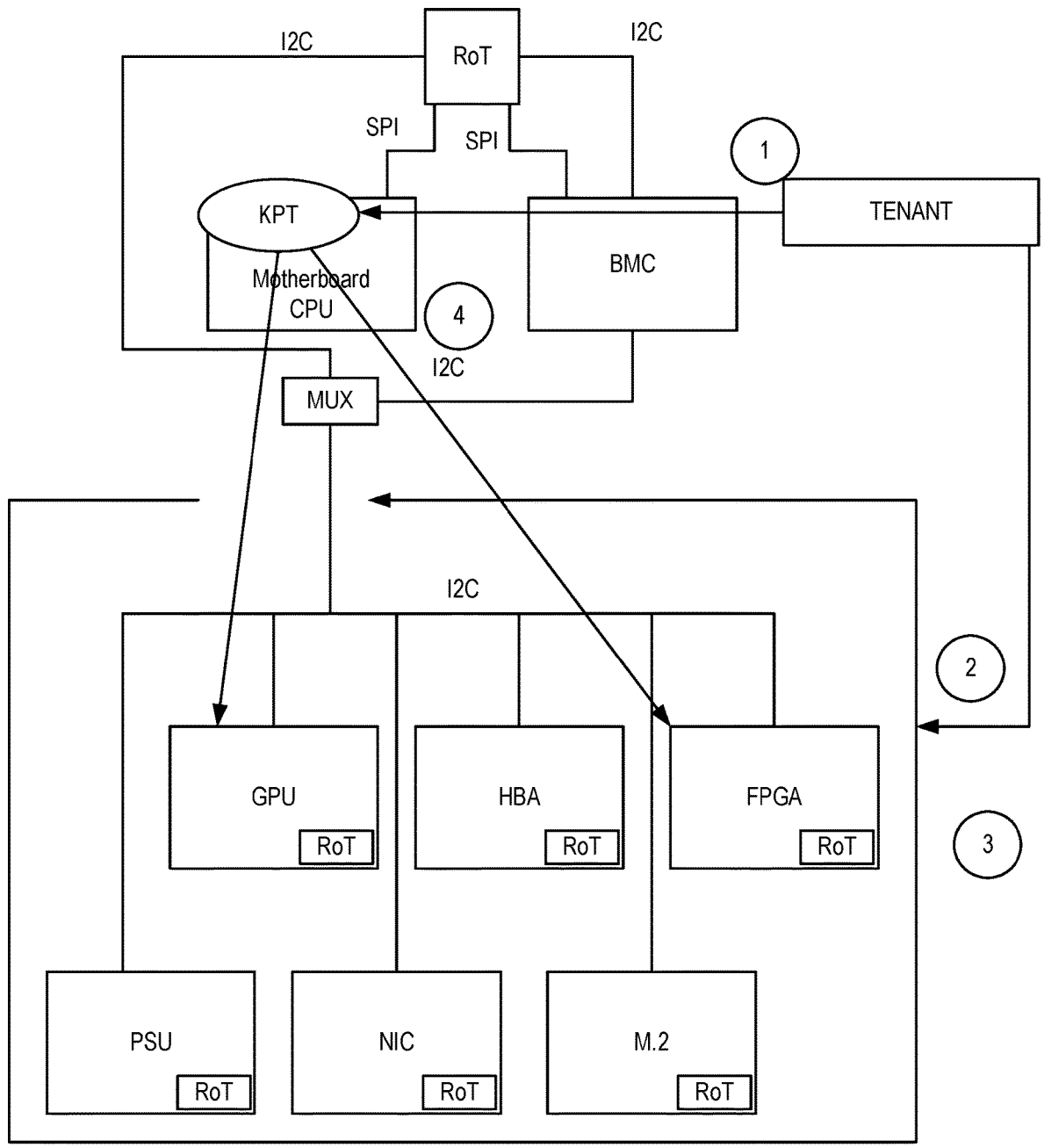
FIG. 9 is a simplified flow diagram of a process for using tenant keys for encrypting and authenticating firmware that may be performed by the system of FIG. 1.

Referring now to FIG. 9, a simplified flow diagram of a process for using tenant keys for encrypting and authenticating firmware that may be performed by the system 100 is shown. More specifically, FIG. 9 illustrates an architecture (e.g., the Open Compute Project (OCP) Cerberus architecture) in which a hardware root-of-trust is present in components of a compute device. FIG. 9 also shows a flow of a process for delivery of tenant firmware encryption keys to the compute platform and for delivery of tenant encrypted images to an infrastructure as a service (IaaS), platform as a service (PaaS), or content service provider (CSP). The encrypted images are decrypted and/or authenticated by the tenant keys on the QAT/KPT (i.e., the cryptography logic unit 150) prior to being installed. In the process, the tenant uses KPT to deliver keys (e.g., FW encryption key (FEK)) securely into the QAT which is on the infrastructure and the CPU. Additionally, the tenant delivers encrypted firmware, encrypted with the tenant's firmware encryption key (FEK), into the IaaS or PaaS, CSP environment. Further, the infrastructure owner deploys the encrypted firmware images onto the platform using their management systems (e.g., Google Titan, Microsoft Open Compute Project Cerberus, etc.). Additionally, the CPU/QAT uses the customer FEK to decrypt firmware images before deploying the firmware images to the various platform devices. The tenant key is never in the clear and is protected while in use by QAT. The decrypted firmware is installed by previously authenticated firmware to build QAT root-of-trust based chain of trust for encrypted firmware installation.

EXAMPLES

Illustrative examples of the technologies disclosed herein are provided below. An embodiment of the technologies may include any one or more, and any combination of, the examples described below.

Example 1 includes a compute device comprising communication circuitry; and circuitry to obtain a tenant key; receive encrypted data associated with a tenant, wherein the encrypted data defines an encrypted image that is executable by the compute device to perform a workload on behalf of the tenant in a virtualized environment; and utilize the tenant key to decrypt the encrypted data and execute the workload without exposing the tenant key to a memory that is accessible to another workload associated with another tenant.

Example 2 includes the subject matter of Example 1, and wherein to obtain the tenant key comprises to receive the tenant key prior to booting an operating system.

Example 3 includes the subject matter of any of Examples 1 and 2, and wherein to receive the encrypted data comprises to receive an encrypted image of at least one of a virtual machine, an encrypted image of a container, an encrypted image of a virtual network function, an encrypted image of firmware, or encrypted configuration data.

Example 4 includes the subject matter of any of Examples 1-3, and wherein to utilize the tenant key comprises to authenticate the encrypted data with the tenant key.

Example 5 includes the subject matter of any of Examples 1-4, and wherein to utilize the tenant key comprises to decrypt encrypted firmware provided by the tenant.

Example 6 includes the subject matter of any of Examples 1-5, and wherein the circuitry is further to execute the decrypted firmware.

Example 7 includes the subject matter of any of Examples 1-6, and wherein to utilize the tenant key comprises to decrypt an encrypted virtual machine image, a container image, or a virtual network function image provided by the tenant.

Example 8 includes the subject matter of any of Examples 1-7, and wherein the circuitry is further to execute at least one of the decrypted virtual machine image, the decrypted container image, or the virtual network function image.

Example 9 includes the subject matter of any of Examples 1-8, and wherein to utilize the tenant key comprises to perform encryption and decryption for data to be utilized by the workload.

Example 10 includes the subject matter of any of Examples 1-9, and wherein to utilize the tenant key comprises to selectively decrypt and encrypt network communications associated with the workload.

Example 11 includes the subject matter of any of Examples 1-10, and wherein to obtain the tenant key comprises to receive the tenant key with a key management services protocol of a unified extensible firmware interface standard.

Example 12 includes the subject matter of any of Examples 1-11, and wherein the memory is also accessible to an operating system and a hypervisor that provides an infrastructure for the virtualized environment.

Example 13 includes a method comprising obtaining, by a compute device, a tenant key; receiving, by the compute device, encrypted data associated with a tenant, wherein the encrypted data defines an encrypted image that is executable by the compute device to perform a workload on behalf of the tenant in a virtualized environment; and utilizing, by the compute device, the tenant key to decrypt the encrypted data and execute the workload without exposing the tenant key to a memory that is accessible to another workload associated with another tenant.

Example 14 includes the subject matter of Example 13, and wherein obtaining the tenant key comprises receiving the tenant key prior to booting an operating system.

Example 15 includes the subject matter of any of Examples 13 and 14, and wherein receiving the encrypted data comprises receiving an encrypted image of at least one of a virtual machine, an encrypted image of a container, an encrypted image of a virtual network function, an encrypted image of firmware, or encrypted configuration data.

Example 16 includes the subject matter of any of Examples 13-15, and wherein utilizing the tenant key comprises authenticating the encrypted data with the tenant key.

Example 17 includes the subject matter of any of Examples 13-16, and wherein utilizing the tenant key comprises decrypting encrypted firmware provided by the tenant.

Example 18 includes the subject matter of any of Examples 13-17, and further including executing the decrypted firmware.

Example 19 includes the subject matter of any of Examples 13-18, and wherein utilizing the tenant key comprises decrypting an encrypted virtual machine image, a container image, or a virtual network function image provided by the tenant.

Example 20 includes a compute device comprising means for obtaining a tenant key; means for receiving encrypted data associated with a tenant, wherein the encrypted data defines an encrypted image that is executable by the compute device to perform a workload on behalf of the tenant in a virtualized environment; and means for utilizing the tenant key to decrypt the encrypted data and execute the workload without exposing the tenant key to a memory that is accessible to another workload associated with another tenant.

What is claimed is:
1. A compute device comprising:
first circuitry including communication circuitry; and
second circuitry to:
 obtain a tenant key;
 access encrypted data associated with a tenant, the encrypted data to define an encrypted image, the encrypted image to be executable by the compute device to perform a workload on behalf of the tenant in a virtualized environment; and
 utilize the tenant key to decrypt the encrypted data and execute the workload without exposing the tenant key to memory that is accessible to another workload associated with another tenant.

2. The compute device of claim 1, wherein the second circuitry is to obtain the tenant key prior to boot of an operating system.

3. The compute device of claim 1, wherein the second circuitry is to obtain the tenant key with a key management services protocol of a unified extensible firmware interface standard.

4. The compute device of claim 1, wherein the encrypted data includes at least one of an encrypted image of a virtual machine, an encrypted image of a container, an encrypted image of a virtual network function, an encrypted image of firmware, or encrypted configuration data.

5. The compute device of claim 1, wherein the second circuitry is to utilize the tenant key to authenticate the encrypted data.

6. The compute device of claim 1, wherein the second circuitry is to utilize the tenant key to selectively decrypt and encrypt network communications associated with the workload.

7. The compute device of claim 1, wherein the memory is to be accessible to an operating system.

8. A compute device comprising:
first circuitry; and
second circuitry to:
decrypt an encrypted tenant key to obtain a decrypted tenant key associated with a first tenant;
obtain encrypted tenant data associated with the first tenant, the encrypted tenant data including an encrypted image of a virtual machine associated with the first tenant, at least a portion of the tenant data to be executable by the first circuitry to perform a workload on behalf of the first tenant; and
decrypt the encrypted tenant data with the decrypted tenant key to obtain the tenant data without exposing the decrypted tenant key to memory that is accessible to another workload associated with another tenant.

9. The compute device of claim 8, wherein the encrypted tenant key is encrypted based on a further key, the further key based on a per-part credential unique to the second circuitry.

10. The compute device of claim 8, wherein the second circuitry is included in a central processing unit (CPU).

11. The compute device of claim 8, wherein the second circuitry is included in a field programmable gate array (FPGA).

12. The compute device of claim 8, wherein the second circuitry is included in a network interface controller (NIC).

13. The compute device of claim 8, wherein the second circuitry is to obtain the encrypted tenant key prior to boot of an operating system.

14. The compute device of claim 8, wherein the second circuitry is to obtain the encrypted tenant key from a key server via a unified extensible firmware interface.

15. A method comprising:
obtaining, at a compute device, a tenant key;
accessing, with the compute device, encrypted data associated with a tenant, the encrypted data defining an encrypted image, the encrypted image executable by the compute device to perform a workload on behalf of the tenant in a virtualized environment; and
utilizing, with the compute device, the tenant key to decrypt the encrypted data and execute the workload without exposing the tenant key to memory that is accessible to another workload associated with another tenant.

16. The method of claim 15, wherein the obtaining of the tenant key includes obtaining the tenant key prior to booting an operating system.

17. The method of claim 15, wherein the obtaining of the tenant key includes obtaining the tenant key with a key management services protocol of a unified extensible firmware interface standard.

18. The method of claim 15, wherein the encrypted data includes at least one of an encrypted image of a virtual machine, an encrypted image of a container, an encrypted image of a virtual network function, an encrypted image of firmware, or encrypted configuration data.

19. The method of claim 15, further including utilizing the tenant key to selectively decrypt and encrypt network communications associated with the workload.

20. The method of claim 15, wherein the memory is accessible to an operating system.

21. The compute device of claim 1, wherein the second circuitry is to store the tenant key in the second circuitry to prevent access to the tenant key by the another tenant.

22. The compute device of claim 8, wherein the second circuitry is to decrypt the encrypted tenant data with the decrypted tenant key without writing the decrypted tenant key to the memory that is accessible to the another tenant to preclude access to the tenant key by the another tenant.

23. The method of claim 15, including storing the tenant key in circuitry separate from the memory that is accessible to the another tenant to avoid access to the tenant key by the another tenant.

* * * * *